United States Patent
Flucke et al.

(10) Patent No.: US 12,225,840 B2
(45) Date of Patent: Feb. 18, 2025

(54) SOWING MACHINE AND METHOD FOR SEPARATING AND SPREADING GRANULAR MATERIAL

(71) Applicant: Amazonen-Werke H. Dreyer SE & Co. KG, Hasbergen (DE)

(72) Inventors: Jan Flucke, Hude (DE); Jan-Eike Luebben, Edewecht (DE); Thomas Wien, Stuhr (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 317 days.

(21) Appl. No.: 17/775,032

(22) PCT Filed: Nov. 2, 2020

(86) PCT No.: PCT/EP2020/080618
§ 371 (c)(1),
(2) Date: May 6, 2022

(87) PCT Pub. No.: WO2021/089448
PCT Pub. Date: May 14, 2021

(65) Prior Publication Data
US 2022/0400603 A1    Dec. 22, 2022

(30) Foreign Application Priority Data
Nov. 8, 2019  (DE) .......... 102019130231.5

(51) Int. Cl.
*A01C 7/08* (2006.01)
*A01C 7/04* (2006.01)
*A01C 7/06* (2006.01)

(52) U.S. Cl.
CPC .............. *A01C 7/084* (2013.01); *A01C 7/046* (2013.01); *A01C 7/06* (2013.01)

(58) Field of Classification Search
None
See application file for complete search history.

(56) References Cited

U.S. PATENT DOCUMENTS

| 4,280,419 A | * | 7/1981 | Fischer | A01C 7/044 |
| | | | | 406/137 |
| 4,450,979 A | * | 5/1984 | Deckler | A01C 7/046 |
| | | | | 222/352 |

(Continued)

FOREIGN PATENT DOCUMENTS

| EP | 2496063 A1 | 9/2012 |
| EP | 2854500 B1 | 4/2016 |

(Continued)

OTHER PUBLICATIONS

International Search Report for International Application No. PCT/EP2020/080618 dated Jan. 29, 2021 and Translation.

(Continued)

*Primary Examiner* — Joseph A Dillon, Jr.
(74) *Attorney, Agent, or Firm* — Potomac Law Group, PLLC; John J. Penny, Jr.

(57) ABSTRACT

A sowing machine and a method for separating and spreading granular material, such as seed or the like, are described, where the material is supplied by way of conveying airflows from a central container to metering devices via conveying ducts respectively associated with them. Furthermore, the material supplied in the conveying ducts is separated from the respective conveying airflow and the resulting discharge airflows are supplied via discharge air ducts to the respectively associated metering devices which are thus pressurized. Furthermore, the metering chambers are pressurized by way of supply airflows via supply ducts respectively associated with the former. The material is separated in the metering chambers by way of separating disks.

18 Claims, 3 Drawing Sheets

(56) References Cited

U.S. PATENT DOCUMENTS

Figure 1:
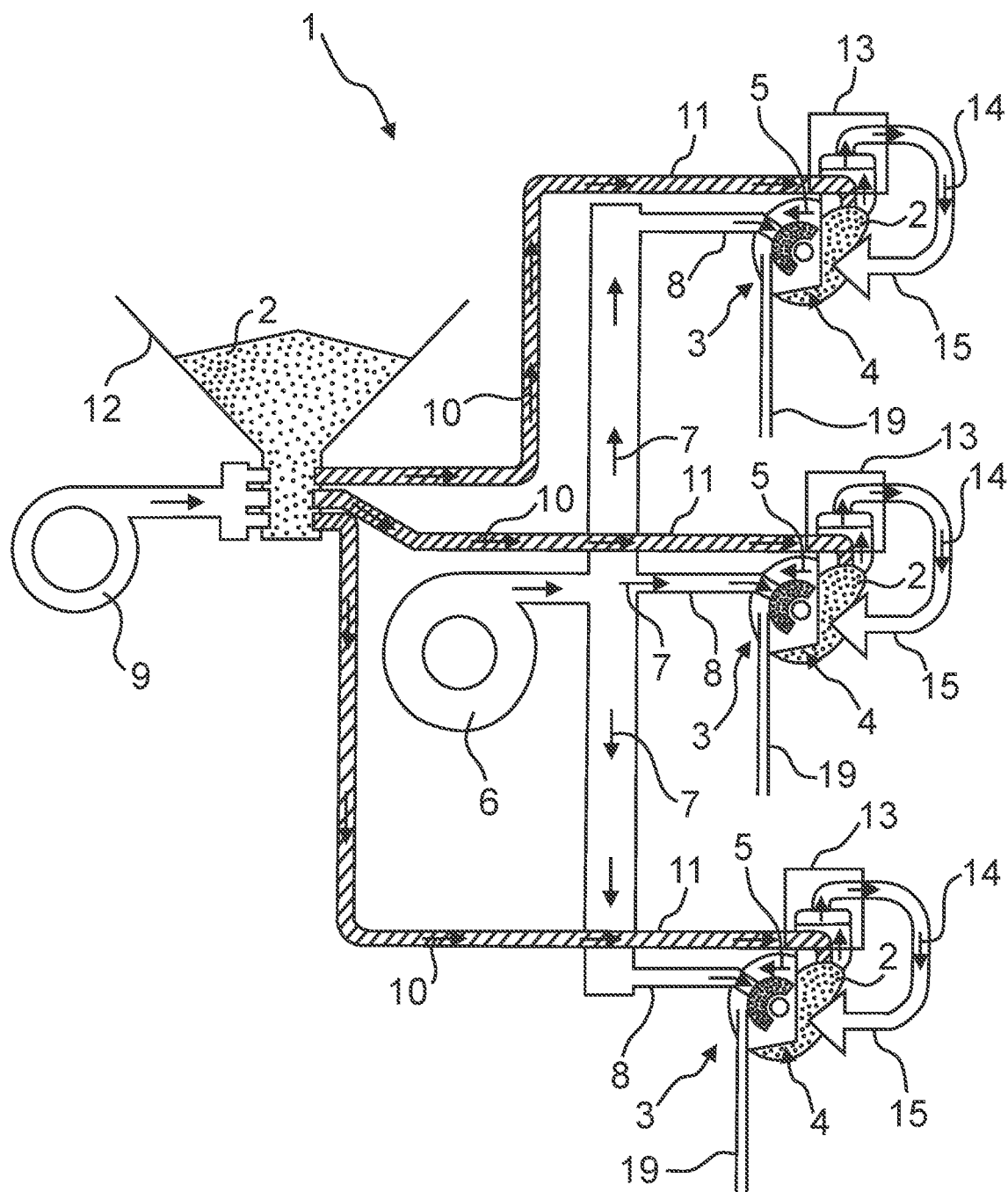

| | | | | |
|---|---|---|---|---|
| 5,052,627 A * | 10/1991 | Balmer | A01C 15/122 | |
| | | | 239/655 | |
| 5,156,102 A * | 10/1992 | Andersen | A01C 7/081 | |
| | | | 111/178 | |
| 5,379,706 A * | 1/1995 | Gage | A01C 15/04 | |
| | | | 406/146 | |
| 5,406,897 A * | 4/1995 | Pingry | A01C 7/042 | |
| | | | 111/59 | |
| 6,782,835 B2 * | 8/2004 | Lee | A01C 7/081 | |
| | | | 111/175 | |
| 6,935,256 B1 * | 8/2005 | Meyer | A01C 7/081 | |
| | | | 111/177 | |
| 9,474,202 B2 * | 10/2016 | Gilstring | A01C 21/00 | |
| 9,919,636 B2 * | 3/2018 | Roberge | B60P 1/60 | |
| 10,219,428 B2 * | 3/2019 | Bedosti | A01C 7/081 | |
| 10,561,058 B2 * | 2/2020 | Gilstring | B65D 88/64 | |
| 10,791,668 B2 * | 10/2020 | Garner | A01C 7/201 | |
| 11,172,602 B2 * | 11/2021 | Jagow | A01C 7/046 | |
| 11,684,007 B2 * | 6/2023 | Bulmahn | A01C 7/046 | |
| | | | 111/177 | |
| 11,785,882 B2 * | 10/2023 | Hilbert | A01C 7/18 | |
| | | | 111/14 | |
| 11,832,549 B2 * | 12/2023 | Janelle | A01C 15/003 | |
| 11,925,136 B2 * | 3/2024 | Wien | A01C 7/081 | |
| 2010/0122644 A1 * | 5/2010 | Memory | A01C 7/088 | |
| | | | 111/11 | |
| 2010/0313801 A1 * | 12/2010 | Peterson | A01C 7/102 | |
| | | | 700/231 | |
| 2013/0333601 A1 * | 12/2013 | Shivak | G05D 7/0605 | |
| | | | 111/177 | |
| 2014/0216315 A1 * | 8/2014 | Beaujot | A01C 7/20 | |
| | | | 111/174 | |
| 2015/0189827 A1 * | 7/2015 | Gilstring | A01C 7/082 | |
| | | | 222/1 | |
| 2015/0282422 A1 * | 10/2015 | Hahn | A01C 7/20 | |
| | | | 111/185 | |
| 2016/0088791 A1 * | 3/2016 | Horsch | A01C 7/102 | |
| | | | 111/149 | |
| 2016/0165794 A1 * | 6/2016 | Czapka | A01C 7/046 | |
| | | | 111/185 | |
| 2020/0010286 A1 * | 1/2020 | Roberge | A01C 21/002 | |
| 2022/0015284 A1 * | 1/2022 | Pirani | A01C 7/163 | |
| 2022/0159903 A1 * | 5/2022 | Luebben | A01C 5/064 | |
| 2022/0400603 A1 * | 12/2022 | Flucke | A01C 7/046 | |
| 2023/0389464 A1 * | 12/2023 | Luebben | A01C 7/081 | |

FOREIGN PATENT DOCUMENTS

| | | |
|---|---|---|
| EP | 3335535 A1 | 6/2018 |
| EP | 3704923 A1 | 9/2020 |

OTHER PUBLICATIONS

Written Opinion for International Application No. PCT/EP2020/080618 dated Jan. 29, 2021 with Translation.

* cited by examiner

SOWING MACHINE AND METHOD FOR SEPARATING AND SPREADING GRANULAR MATERIAL

RELATED APPLICATIONS

This application is a 35 U.S.C. 371 national stage filing of International Application No. PCT/EP2020/080618, filed on Nov. 2, 2020, which claims priority to German Application DE 10 2019 130 231.5, filed on Nov. 8, 2019, the contents of which are hereby incorporated by reference.

The invention relates to a sowing machine for separating and spreading granular material, such as seed, fertilizer, or pesticide and a corresponding method.

A generic sowing machine and a generic method are known from EP 2 854 500 B1. According thereto, granular material is supplied by way of conveying airflows via respectively associated conveying ducts from a central container to several metering devices. The granular material is separated from the conveying airflows in separating devices and supplied to the respectively associated metering devices. The latter are furthermore supplied via supply ducts with supply airflows, which are generated, for example, by way of a separate blower and are used to pressurize the metering devices. This is required in order to cover the separating disks present therein with the granular material in a manner as controlled as possible, which is then dispensed via a seed duct thusly separated.

Discharge airflows resulting from the separation of the material in the separating devices are routed via discharge air ducts into the individual supply ducts and then supplied together with the supply airflows to the respectively associated metering devices. In order to efficiently mix the discharge air in the supply ducts with the supply airflows, the respectively combined airflows should have comparable pressure levels. However, pressure losses occur in the supply airflow due to the high volumetric airflow, so that the pressure prevailing in the region of the supply duct is inevitably higher than in the region of the metering device in order to obtain the pressure required there. Due to this pressure difference and the conditions for introducing the discharge air into the supply airflows, comparatively high pressure levels prevail also in the region of the separated material, in the seed duct adjoining downwardly, and in the associated metering chamber.

Surprisingly, it has now been found that these high pressure levels impede the typical stirring of the granular material in the inlet region of the metering device and can lead to the separating disk being incorrectly covered with the granular material. This impairs the separating quality.

There is therefore a need for sowing machines that are improved in this respect and methods for separating and spreading granular material such as seed, fertilizer, pesticide, or the like.

The object posed is satisfied by a sowing machine and a method according to the disclosure.

According thereto, the sowing machine comprises at least two metering devices with metering chambers and separating disks arranged therein for separating the granular material and at least one blower for generating supply airflows for pressurizing the individual metering chambers via respectively associated supply ducts and for generating conveying airflows for supplying the granular material from a central container to the individual metering devices via respectively associated conveyor ducts. In addition, the sowing machine comprises separating devices, which are provided in the region of the metering devices upstream of the metering devices in order to separate the material supplied in the conveying ducts from the respective conveying airflow and to provide the resulting discharge airflows via discharge air ducts to the respectively associated metering devices for their pressurization.

According to the invention, the supply ducts and the discharge air ducts open out separately from one another into the metering chambers that are jointly associated therewith.

During operation, the pressure prevailing in the metering chambers is inevitably lower than in the respectively associated supply ducts. Since the discharge air ducts open directly into the metering chambers, in contrast to the known opening of the discharge air ducts into the supply ducts upstream of the metering chambers, the discharge air ducts can be kept at a lower pressure level and the pressure in the respectively associated separating device can therefore be reduced compared to known sowing machines with seed tracking. As a result, the pressure level in the region of the seed duct downstream of the separating device can also be reduced.

As a result, the granular material moving up there can be stirred better and it can be prevented that the granular material is pressed excessively onto the separating disk. For example, it is possible to prevent the granular material from adhering too much to regions of the separating disk that are not to be covered and from impeding the supply of the granular material to the depressions provided for this purpose in the separating disk. In addition, scraping off of the separating disk is simplified.

This overall improves the coverage of the separating disks with the granular material and consequently the separating quality of the metering devices.

The discharge air ducts preferably open out into partial regions of the metering chambers in which a conveying path of the separating disks runs upwardly. The granular material advancing from above through the seed duct typically collects in a lower region of the separating disk. The conveying path thereafter ascends along the separating disk on a circular path, where the granular material is collected by the separating disk.

Also disposed in the ascending part of the conveying path is a scraping device for scraping off excess granular material from the separating disk. Directing the discharge airflows selectively to the part of the ascending conveying path can favorably influence the covering of the separating disk with the granular material and the scraping off of the separating disk.

Scraping elements for scraping off of the separating disks are preferably arranged in the metering chambers, wherein the discharge air ducts open out, with respect to a conveying path of the separating disks, upstream of the scraping elements and/or in their region. As a result, for example, granular material that has remained on a holder provided at the scraping device for adjusting the scraper can be blown off.

Preferably, the sowing machine further comprises at least one air distributor arranged downstream of the blower for adjusting the conveying airflows and the supply airflows such that the discharge airflow supplied to the individual metering devices is weaker than the supply airflow supplied, in particular at most half as strong. For example, the volume flow of the supply airflow is then two to five times greater than the simultaneously supplied volume flow of the discharge airflow.

As a result, the overpressure level required for the separation in the metering chamber can be produced predominantly with the supply airflow and the discharge airflow can be used to supplement the pressurization in a region of the scraping device and/or downstream thereof.

An air distributor is suitable in the context of a blower with adjustable conveying capacity for setting a conveying airflow required for the respective tracking of the granular material as well as for creating a suitable pressure level within the metering chamber with the aid of the supply airflow. Separate blowers for generating the conveying airflows and the supply airflows are then dispensable.

In a further favorable embodiment of the sowing machine, it comprises at least one first blower for generating the conveying airflows and at least one independently adjustable second blower for generating the supply airflows. The first and the second blower are configured and controllable such that the discharge airflow supplied to the individual metering devices is weaker, in particular with regard to the volume flow, than the supply airflow supplied, in particular likewise with regard to the volume flow, preferably at most half as strong. In particular, the volume flow of the supply airflow is then twice to five times as great as the volume flow of the discharge airflow. The conveying airflows and the supply airflows can then be controlled independently of one another in a comparatively flexible and simple manner.

In a further advantageous embodiment, the sowing machine furthermore comprises valves associated with the discharge air ducts and/or supply ducts for the adjustable weakening of the discharge airflows and/or supply airflows such that a mixing ratio of the discharge airflow and supply airflow supplied to the individual metering devices can be set. In particular, the discharge airflow is weaker than the supply airflow supplied, in particular at most half as strong.

In particular, the volume flow of the supply airflow is then twice to five times as great as the volume flow of the discharge airflow.

As a result, the volume flow of the discharge airflow can also be reduced independently of the pressure level prevailing on the inlet side in the associated separating device. This is particularly advantageous in conjunction with a central air distributor or separate blowers, as described above.

Preferably, the sowing machine also comprises at least one measuring device for measuring a volume flow and/or an overpressure in at least one of the separating devices and/or discharge air ducts. On this basis, volume flows of the discharge air can also be adapted to target values under changing working conditions in the sense of a selectively and reproducibly feeding discharge airflows into the metering devices.

The method described is used for separating and spreading granular material, such as seed, fertilizer, pesticide or the like. For this purpose, the granular material is conveyed by way of conveying airflows from a central container into metering devices via respectively associated conveying ducts, where the material supplied in the conveying ducts is separated from the respective conveying airflow and the resulting discharge airflows are supplied via discharge air ducts to the respectively associated metering devices which are thereby pressurized. Furthermore, the metering chambers are pressurized by way of supply airflows via respectively associated supply channels. The granular material is separated in the metering chambers by way of separating disks.

According to the invention, the supply airflows and the discharge airflows are fed into the metering chambers spatially separately from one another. The advantages described with regard to the sowing machine according to the invention can thus be achieved.

The discharge airflows are preferably fed into the metering chambers, with regard to a conveying flow of the granular material at the separating disks, upstream of the supply airflows. As a result, a collection region for the granular material in the metering chamber can be subjected to the discharge airflow in a selective manner, for example, to support the granular material being stirred and/or to facilitate the separating disk being covered and scraped off.

The discharge airflows are preferably directed onto scraping devices for the separating disks present in the metering chambers and/or partial regions of the metering chambers located upstream thereof. As a result, for example, granular material that has remained on a holder at the scraping device for adjusting the scraper can be blown off.

The supply airflows fed in are preferably stronger than the discharge airflows fed in, in particular at least twice as strong. It is particularly favorable to have the supply airflows have a volume flow that is twice to five times as large as the discharge airflows.

The pressure levels prevailing in the discharge air ducts during the separation are preferably lower than in the supply ducts, in particular in the associated sections immediately before being fed into the metering devices. As a result, a comparatively large conveying flow and therefore a comparatively large mass flow of the granular material can be supplied to the separating device and the metering device without impeding the separating disks from being covered with the granular material, in particular in the region of a stirrer present in the metering devices.

The supply airflows and the conveying airflows are preferably generated in blowers that are separate from one another and/or central airflow division downstream of at least one common blower. As a result, the conveying airflows and the supply airflows can be adjusted flexibly and in an automated manner as required to track the granular material during ongoing operation of the sowing machine by way of control/regulation.

Preferred embodiments of the invention shall be illustrated by way of drawings, where:

FIG. 1 shows a schematic representation of the sowing machine with the airflow guidance described;

FIG. 2 shows a schematic representation of a metering chamber with the supply airflow and the airflow being fed in;

FIG. 3 shows the sowing machine according to FIG. 1 with alternative central airflow guidance.

As can be seen in FIG. 1, sowing machine 1 for separating and spreading granular material 2, such as seed, fertilizer, pesticide, or the like, comprises several metering devices 3 with metering chambers 4 and separating disks 5 arranged therein (indicated by the arrow for the direction of rotation) for separating granular material 2.

Furthermore, sowing machine 1 preferably comprises a first blower 6 for generating supply airflows 7 for pressurizing individual metering chambers 4 via supply ducts 8 respectively associated with them.

Furthermore, sowing machine 1 preferably comprises a second blower 9 for generating conveying airflows 10 for supplying granular material 2 to individual metering devices 3 via conveying ducts 11 associated with them. For this purpose, granular material 2 is made available in a known manner in a central container 12 at sowing machine 1.

Arranged on metering devices 3 upstream of the mass flow are separating devices 13 in which granular material 2 supplied in conveying ducts 11 is separated from conveying airflow 10 respectively loaded therewith. The separating results in substantially unloaded discharge airflows 14 which are supplied via discharge air ducts 15 to the respectively associated metering devices 3 in order to pressurize them.

Supply ducts 8 and discharge air ducts 15 open in a manner spatially separated from each other into jointly associated metering chambers 4 and preferably also into different regions of metering chambers 4.

Figure 2:
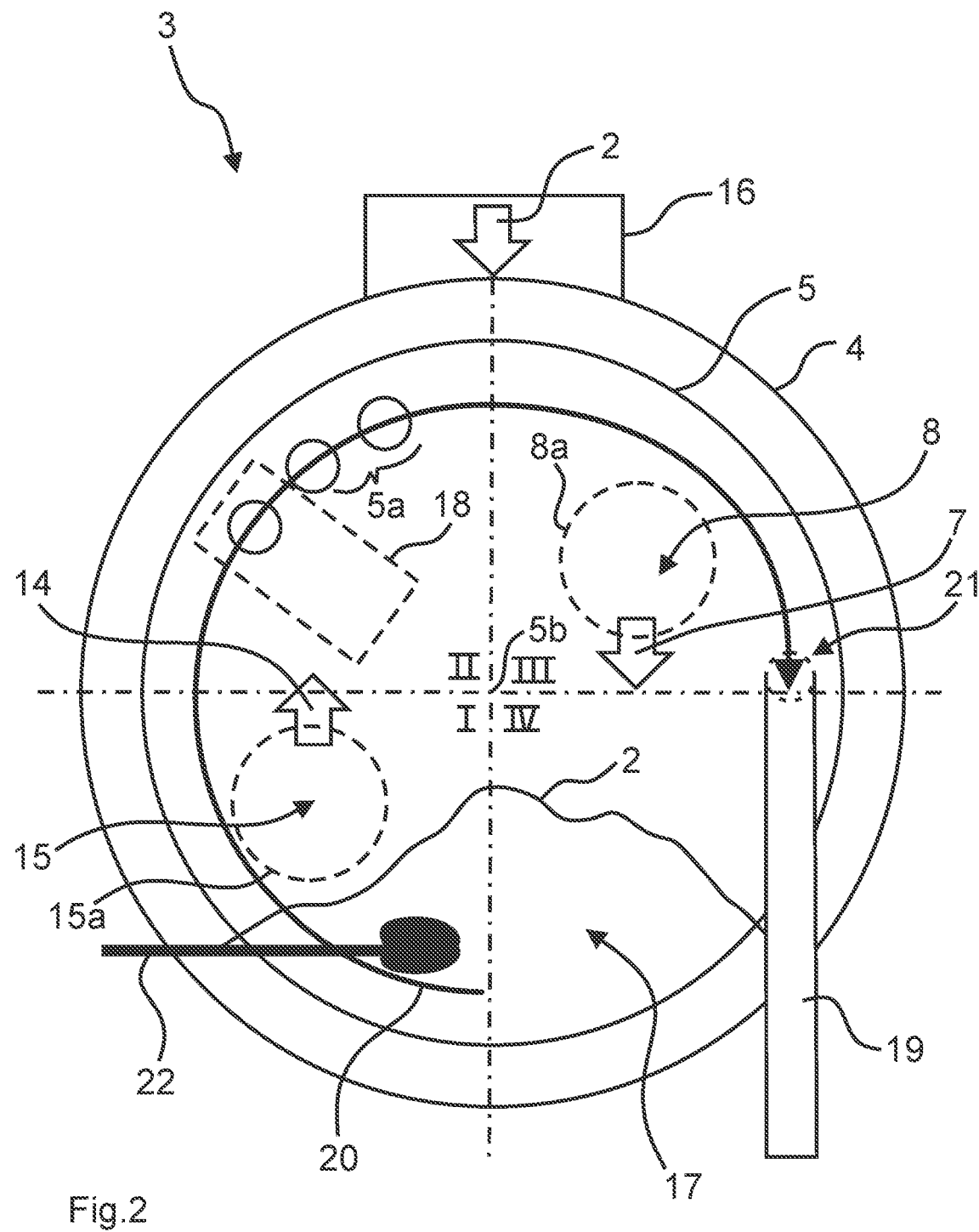

FIG. 2 schematically shows one of metering chambers 4 with a separating disk 5 rotatable therein. A seed duct 16 through which granular material 2 arriving from above from separating device 13 moves onward into metering chamber 4 is also shown schematically. Granular material 2 can accumulate in a lower collection region 17 within metering chamber 4 for subsequent separation.

Shown only in sections are depressions 5a distributed over the entire circumference in the separating disk 5 in a known manner for receiving/separating granular material 2 as well as a scraping device 18 for scraping off separating disk 5. For the sake of completeness, a dispensing duct 19 for separated granular material 2 is also indicated, see also FIG. 1.

Starting out from the collection region 17, depressions 5a define a conveying path 20 (indicated by an arrow) of separating disk 5. Conveying path 20 runs substantially from collection region 17 to a dispensing point 21 at which separated granular material 2 leaves depressions 5a and is dispensed through dispensing duct 19 by metering device 3.

A feed opening 15a, being the first one with respect to conveying path 20, at which the discharge air duct 15 opens into metering chamber 4, and a feed opening 8a, being the second one with respect to conveying path 20, at which the supply duct 8 opens into metering chamber 4, are also shown by way of example.

First feed opening 15a (of discharge air duct 15) as well as scraping device 18 are therefore arranged in a region of metering chamber 4 in which conveying path 20 runs upwardly, i.e. in the direction toward seed duct 16.

Second feed opening 8a (of supply duct 8) is preferably arranged downstream of first feed opening 15a in a region of metering chamber 4 in which conveying path 20 of separating disk 5 runs downwardly again.

Alternatively, metering chamber 4 in FIG. 2 is divided horizontally/vertically into quadrants I to IV with respect to axis of rotation 5b of separating disk 5. As can be seen in this regard, first feed opening 15a is disposed, with respect to conveying path 20, preferably in the first quadrant I, scraping device 18 in the respective second quadrant II and second feed opening 8a in the respective third quadrant III. Alternatively, an arrangement of first feed opening 15a would also be conceivable in the region of the second quadrant II or at its transition to the first quadrant I.

The separate feeding of discharge airflow 14 through first feed opening 15a in the ascending part of conveying path 20, i.e. in first quadrant I and/or second quadrant II, enables particularly reliable covering of separating disk 5 with granular material 2 and/or selective blowing onto scraping device 18, for example, in order to remove residues of granular material 2 from holders for scraping elements or the like that are present thereon.

In contrast, the separate feeding of supply airflow 7 through feed opening 8a disposed downstream, i.e. in particular in third quadrant III, enables a separately adjustable basic pressurization of metering chamber 4 for separating granular material 2 at separating disk 5.

In this context, the direct fluidic connection in terms of flow technology between separating device 13 and first feed opening 15a via discharge air duct 15 is particularly advantageous, so that a comparatively low pressure level can be set therein as well as in separating device 13, without thereby reducing in an unfavorable manner the mass flow of granular material 2 that can be supplied with the respective conveying airflow 10 for which a certain pressure difference between blower 9 generating conveying flow 10 and separating device 13 must not be undercut. The pressure level in separating device 13 can therefore be kept as low as in metering device 3. This promotes separating disk 5 to be covered with granular material 2 in a proper manner and in particular also granular material 2 to be stirred efficiently by way of a stirrer 22 indicated only schematically in FIG. 2.

In addition to improving the separating quality, the individual compressed air flows can also be generated more efficiently than with the known combination of the supply airflows and discharge airflows upstream of the metering devices.

Figure 3:
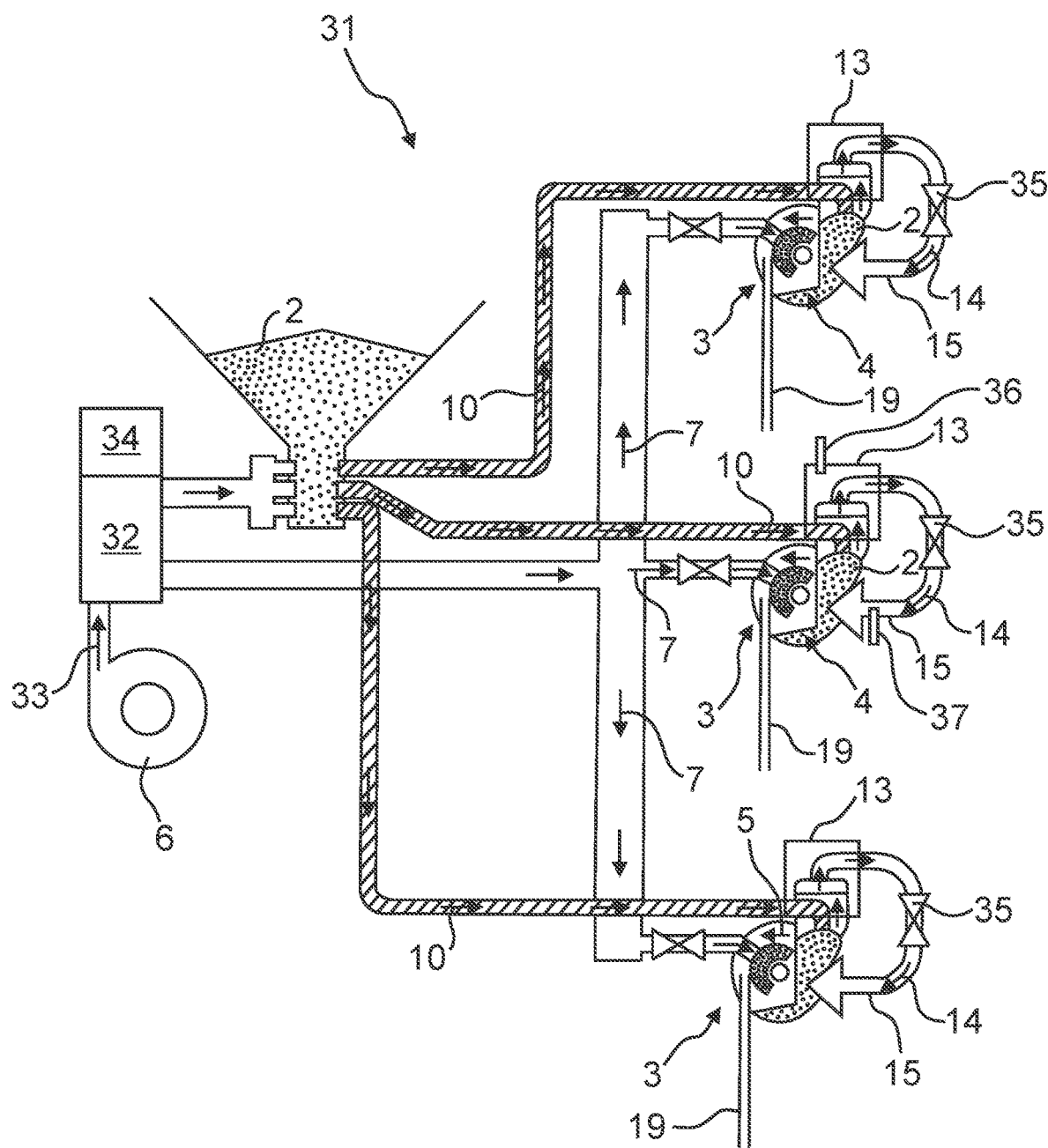

Sowing machine 31 in FIG. 3 is shown by way of example as an alternative embodiment, which differs from sowing machine 1 described above substantially only in the central air supply. According thereto, sowing machine 31 does not require a separate blower for supply airflows 7 and conveying airflows 10. For example, only first blower 6 or second blower 9 can instead be present for this purpose as well as a central air distributor 32 arranged downstream thereof which divides a total airflow 33 (presently generated by blower 6 by way of example) into supply airflows 7 and conveying airflows 10.

For this purpose, blower 6 as well as central air distributor 32 can preferably be controlled/regulated by a controller 34 shown by way example, so that, firstly, total airflow 33 and, secondly, its division into supply airflows 7 and conveying airflows 10 can be adjusted.

Optionally, a valve 35 for attenuating discharge airflow 14 or supply airflow 7 that is passed through could additionally be present in each of discharge air ducts 15 and supply ducts 8. As a result, respective discharge airflow 14 and/or supply airflow 7 could be additionally reduced independently of the pressure level prevailing at the inlet side in associated separating device 13. A mixing ratio of discharge airflow 14 respectively supplied to individual metering devices 3 and supply airflow 7 can then be adjusted.

Also indicated schematically are measuring devices 36, 37 for measuring an overpressure in at least one of separating devices 13 and/or for measuring a volume flow in at least one of discharge air ducts 15. Discharge airflows 14 can thereby be controlled/regulated in a selective manner under different operating conditions in the region of separating devices 13.

It presently goes without saying that controller 34, valves 35, and/or measuring devices 36, 37, which are shown only by way of example in FIG. 3, are likewise present at sowing machine 1 previously described in order to control/regulate blowers 6, 9 and thereby supply airflows 7, conveying airflows 10 and ultimately also discharge airflows 14 that are generated separately thereby.

During operation of sowing machine 1, 31, supply airflows 7 respectively fed into metering chambers 4 are preferably stronger than discharge airflows 14 fed in at the same time. It has been found to be advantageous to adjust at least one of blowers 6, 9 and/or central air distributor 32 and/or valves 35 such that supply airflows 7 are each at least twice as strong as associated discharge airflows 14 A ratio of 1:2 to 1:5 of discharge airflow 14 respectively fed in to supply airflow 7 respectively fed into same metering device 3 has proven to be particularly practical. This value preferably relates to the ratio of the respective volume flows.

This allows the separating quality of granular material 2 ultimately dispensed by sowing machine 1, 31, i.e. in individual dispensing ducts 19, to be optimized comparatively flexibly, for example, with regard to different granular goods 2 and/or operating conditions.

The invention claimed is:

1. A sowing machine for separating and spreading granular material, comprising:
    metering devices with metering chambers and separating disks arranged therein for separating said granular material;
    at least one blower for generating supply airflows for pressurizing said individual metering chambers via respectively associated supply ducts and for generating conveying airflows for supplying said granular material from a central container to said individual metering devices via respectively associated conveying ducts; and
    separating devices which are provided in the region of said metering devices and upstream of said metering devices in order to separate the material supplied in said conveying ducts from the respective conveying airflow and to provide the resulting discharge airflows via discharge air ducts to said respectively associated metering devices for their pressurization,
        wherein said supply ducts and said discharge air ducts open out separately from one another into said metering chambers that are associated jointly with said supply ducts and said discharge air ducts.

2. The sowing machine of claim 1, wherein said discharge air ducts open out into said metering chambers, with respect to a conveying path of said separating disks, upstream of said supply ducts.

3. The sowing machine of claim 1, wherein said discharge air ducts open out into partial regions of said metering chambers in which a conveying path of said separating disks runs upwardly.

4. The sowing machine of claim 1, wherein scraping devices for scraping off said separating disks are arranged in said metering chambers and said discharge air ducts open out, with respect to a conveying path of said separating disks, upstream of said scraping devices and/or in their region.

5. The sowing machine of claim 1, further comprising at least one air distributor arranged downstream of said blower for adjusting the conveying airflows and the supply airflows such that the discharge airflow respectively supplied to said individual metering devices is weaker than the supply airflow respectively supplied.

6. The sowing machine of claim 1, comprising at least one first blower for generating the supply airflows and at least one independently adjustable second blower for generating the conveying airflows, wherein said first and said second blower are configured and controllable such that the discharge airflow respectively supplied to said individual metering devices is weaker than the supply airflow respectively supplied.

7. The sowing machine of claim 1, further comprising valves associated with said discharge air ducts and/or supply ducts for the adjustable weakening of the discharge airflows and/or supply airflows such that a mixing ratio of the discharge airflow and the supply airflow respectively supplied to said individual metering devices can be set.

8. The sowing machine of claim 1, further comprising at least one measuring device for measuring a volume flow and/or an overpressure in at least one of said separating devices and/or discharge air ducts.

9. A method for separating and spreading granular material, wherein said granular material is supplied from a central container to metering devices via respectively associated conveying ducts, wherein said granular material supplied in said conveying ducts is separated from the respective conveying airflow and the resulting discharge airflows are supplied via discharge air ducts to said respectively associated metering devices which are thereby pressurized, wherein said metering devices are pressurized via respectively associated supply ducts by way of supply airflows, and wherein said granular material is separated in said metering devices by way of separating disks, wherein
    wherein the supply airflows and the discharge airflows are fed into said metering devices spatially separated from one another.

10. The method of claim 9, wherein the discharge airflows are fed in, in relation to a conveying stream of said granular material at said separating disks, upstream of the supply airflows.

11. The method of claim 9, wherein the discharge airflows are directed onto scraping devices for said separating disks present in said metering devices and/or partial regions of said metering devices located upstream thereof.

12. The method of claim 9, wherein the supply airflows fed in are stronger than the discharge airflows fed in.

13. The method of claim 9, wherein pressure levels in said discharge airducts respectively prevailing during the separation are lower than in said supply ducts.

14. The method of claim 9, wherein the supply airflows and the conveying airflows are generated by way of separate blowers and/or by central airflow division downstream of at least one blower for generating a common total airflow.

15. The sowing machine of claim 5, wherein the discharge airflow respectively supplied to said individual metering devices is at most half as strong as the supply airflow respectively supplied.

16. The sowing machine of claim 6, wherein said first and said second blower are configured and controllable such that the discharge airflow respectively supplied to said individual metering devices is at most half as strong as the supply airflow respectively supplied.

17. The method of claim 12, wherein the supply airflows fed in are twice as strong as the discharge airflows fed in and the supply airflows have a volume flow twice to five times as large as the discharge airflows.

18. The method of claim 13, wherein pressure levels in said discharge airducts respectively prevailing during the separation are lower than in associated sections immediately before being fed into said metering devices.

* * * * *